US011669067B2

(12) United States Patent
Kawauchi et al.

(10) Patent No.: US 11,669,067 B2
(45) Date of Patent: Jun. 6, 2023

(54) WORK MANAGEMENT APPARATUS, WORK MANAGEMENT METHOD, AND WORK MANAGEMENT SYSTEM

(71) Applicant: FUJIKIN INCORPORATED, Osaka (JP)

(72) Inventors: Yuto Kawauchi, Osaka (JP); Yuya Suzuki, Osaka (JP); Ryutaro Tanno, Osaka (JP); Akihiro Harada, Osaka (JP); Tsutomu Shinohara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 199 days.

(21) Appl. No.: 17/311,852

(22) PCT Filed: Nov. 25, 2019

(86) PCT No.: PCT/JP2019/045937
§ 371 (c)(1),
(2) Date: Jun. 8, 2021

(87) PCT Pub. No.: WO2020/121790
PCT Pub. Date: Jun. 18, 2020

(65) Prior Publication Data
US 2022/0019187 A1 Jan. 20, 2022

(30) Foreign Application Priority Data
Dec. 14, 2018 (JP) .............................. JP2018-234455

(51) Int. Cl.
G05B 19/401 (2006.01)
(52) U.S. Cl.
CPC .. G05B 19/401 (2013.01); G05B 2219/39188 (2013.01); G05B 2219/49056 (2013.01)

(58) Field of Classification Search
CPC ........... G05B 2219/39188; G05B 2219/49056; G05B 15/02; G05B 19/401
See application file for complete search history.

(56) References Cited

U.S. PATENT DOCUMENTS

2008/0177417 A1  7/2008  Kasuga et al.
2009/0326699 A1  12/2009  Coffland et al.
(Continued)

FOREIGN PATENT DOCUMENTS

CN  101231521  7/2008
CN  106203638  12/2016
(Continued)

OTHER PUBLICATIONS

Official Communication issued in International Bureau of WIPO Patent Application No. PCT/JP2019/045937, dated Jan. 28, 2020.
(Continued)

Primary Examiner — Ronald D Hartman, Jr.
(74) Attorney, Agent, or Firm — Greenblum & Bernstein, P.L.C.

(57) ABSTRACT

A work management apparatus, method, and system enable to accurately manage position, tightening torque and other information for all fastening parts, for tightening work using a tool with a torque sensor. The system includes: a driver provided with a torque sensor; and first and second cameras that capture images of a product from different viewpoints. The torque sensor starts measurement of the tightening torque when a detected tightening torque exceeds a set threshold value, stops measurement of the tightening torque when the measurement data satisfies a predetermined condition, and outputs torque related data that includes measurement time. The system further includes: a PC that calculates coordinates of an engagement position of a bit from a plurality of image data captured by the first and the second cameras corresponding to the measurement time
(Continued)

included in the torque related data; and a marker mounting device provided with a marker and removably mounted to the bit.

16 Claims, 19 Drawing Sheets

(56) References Cited

U.S. PATENT DOCUMENTS

| | | | | |
|---|---|---|---|---|
| 2011/0022217 A1* | 1/2011 | Asamizu | ............... | B62D 65/06 901/7 |
| 2011/0208355 A1* | 8/2011 | Tsusaka | ................... | B25J 13/08 901/31 |
| 2013/0174698 A1* | 7/2013 | Yamamoto | ............. | B25B 23/15 81/468 |
| 2017/0185447 A1 | 6/2017 | Meki | | |
| 2017/0197302 A1 | 7/2017 | Kobayashi | | |
| 2018/0165804 A1* | 6/2018 | Sakakibara | ........ | G01B 9/02017 |
| 2018/0215038 A1* | 8/2018 | Ueda | ...................... | B25J 9/1633 |
| 2019/0061075 A1* | 2/2019 | Hohmann | ............. | B23P 19/067 |
| 2021/0146513 A1* | 5/2021 | Banzola | ............. | B25B 23/1425 |

FOREIGN PATENT DOCUMENTS

| | | |
|---|---|---|
| CN | 106934519 | 7/2017 |
| JP | 8-155848 | 6/1996 |
| JP | 2005-259067 | 9/2005 |
| JP | 2007-3013 | 1/2007 |
| JP | 2008-181344 | 8/2008 |
| JP | 2011-240425 | 12/2011 |
| JP | 2013-851 | 1/2013 |
| JP | 2013-852 | 1/2013 |
| JP | 2013-132736 | 7/2013 |
| JP | 2013-188858 | 9/2013 |
| JP | 5632527 B1 * | 11/2014 |
| JP | 2015-179304 | 10/2015 |
| JP | 2015-196231 | 11/2015 |
| JP | 2015-229210 | 12/2015 |
| JP | 2016-91316 | 5/2016 |
| JP | 2017-56532 | 3/2017 |
| JP | 2018-514875 | 6/2018 |
| JP | WO2019/111846 | 6/2019 |
| JP | 2020197806 A * | 12/2020 |
| KR | 2018-0063387 | 6/2018 |
| TW | 201435765 | 9/2014 |
| TW | 201604800 | 2/2016 |
| WO | WO-2012017956 A1 * | 2/2012 ............ B23P 19/066 |
| WO | WO-2014034194 A1 * | 3/2014 ............ B25B 23/14 |
| WO | WO-2019111846 A1 * | 6/2019 ............ B25B 23/14 |
| WO | WO-2021176645 A1 * | 9/2021 |

OTHER PUBLICATIONS

Office Action issued in Corresponding CN Application No. 201980082441, dated May 7, 2022, along with an English translation thereof.

Office Action Issued in Corresponding Korean Patent Application No. 2021-7019062, dated Sep. 30, 2022, along with an English translation thereof.

* cited by examiner

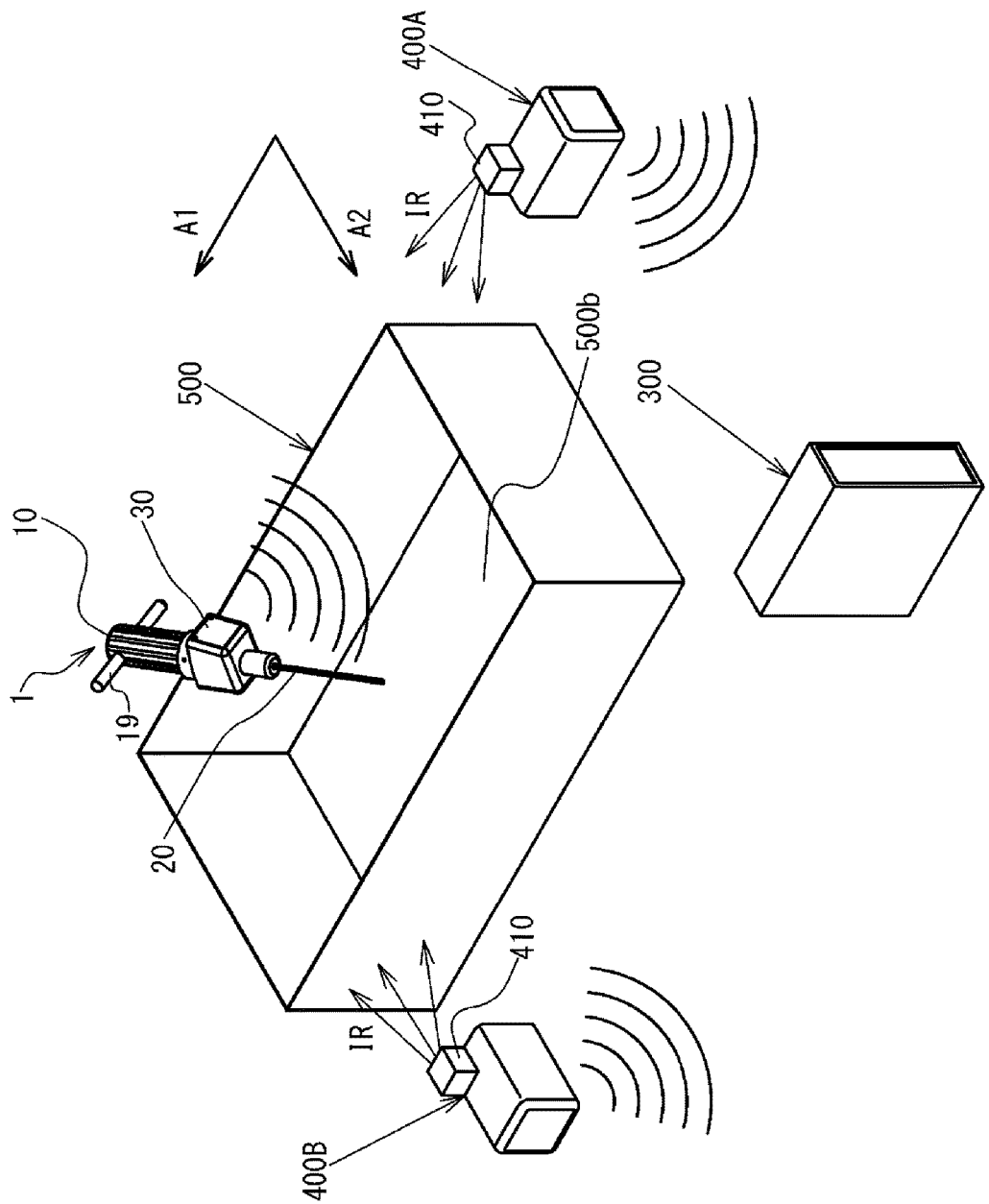
[fig.1]

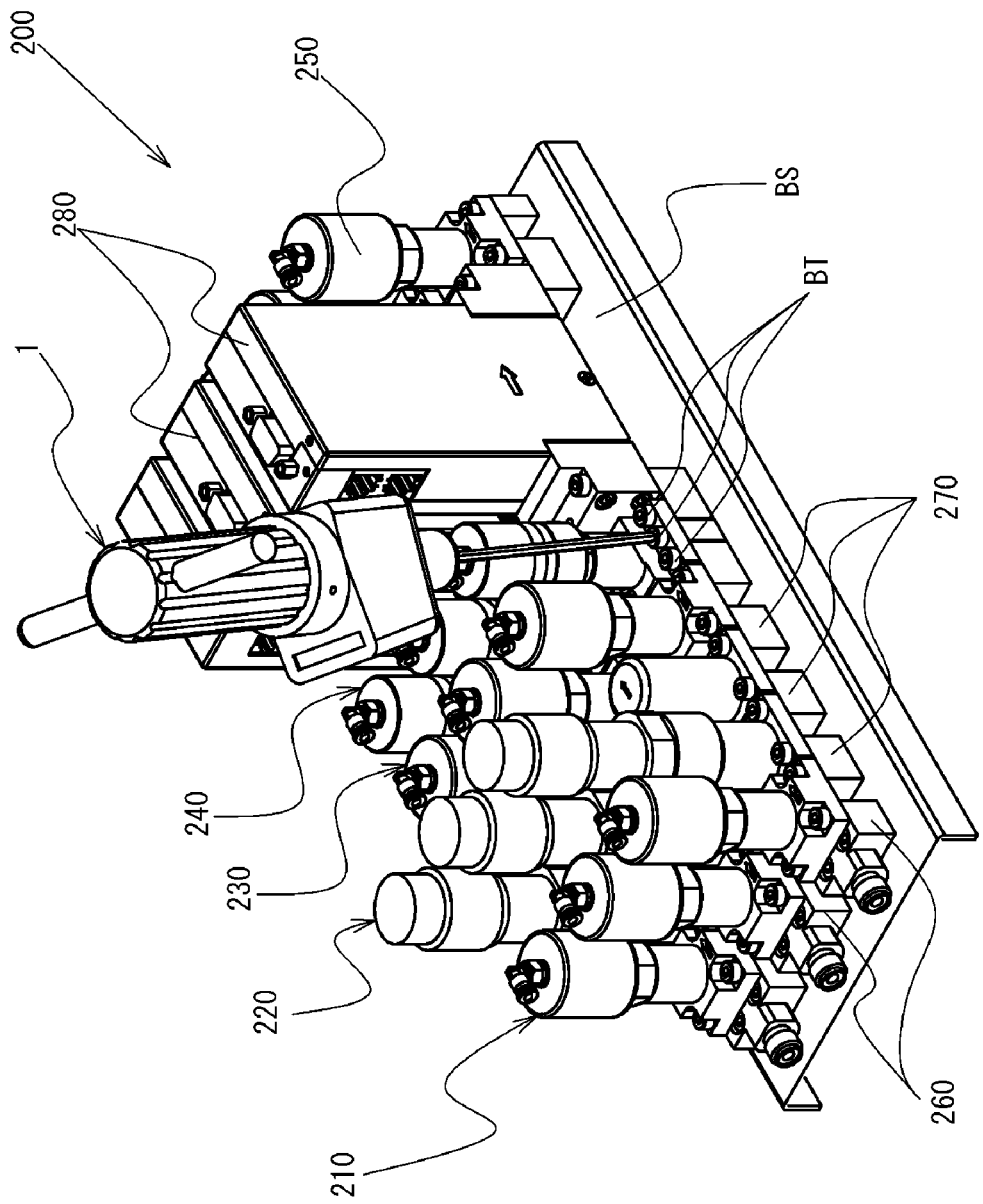
[fig.2]

【fig.3】
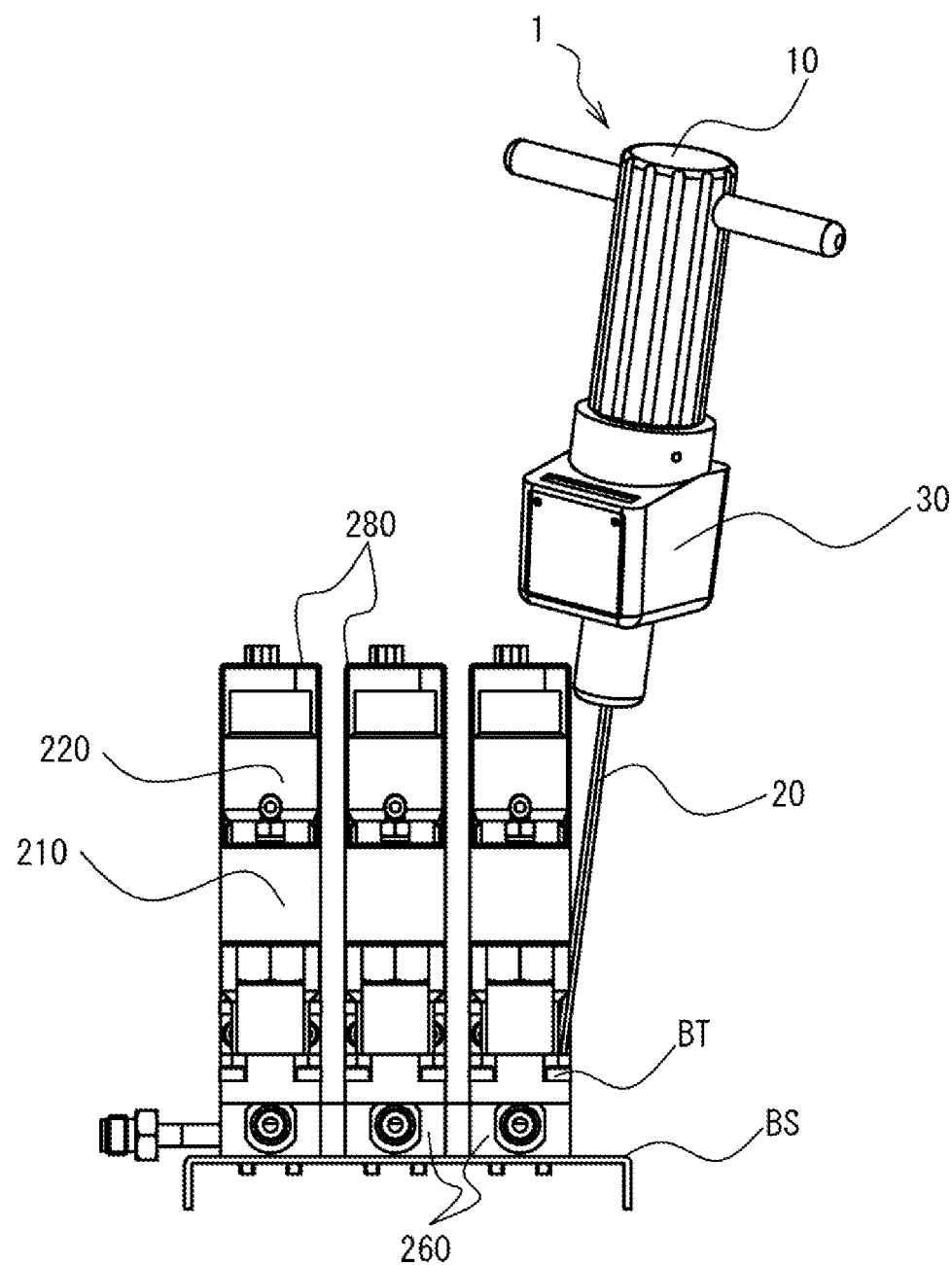

【fig.4A】
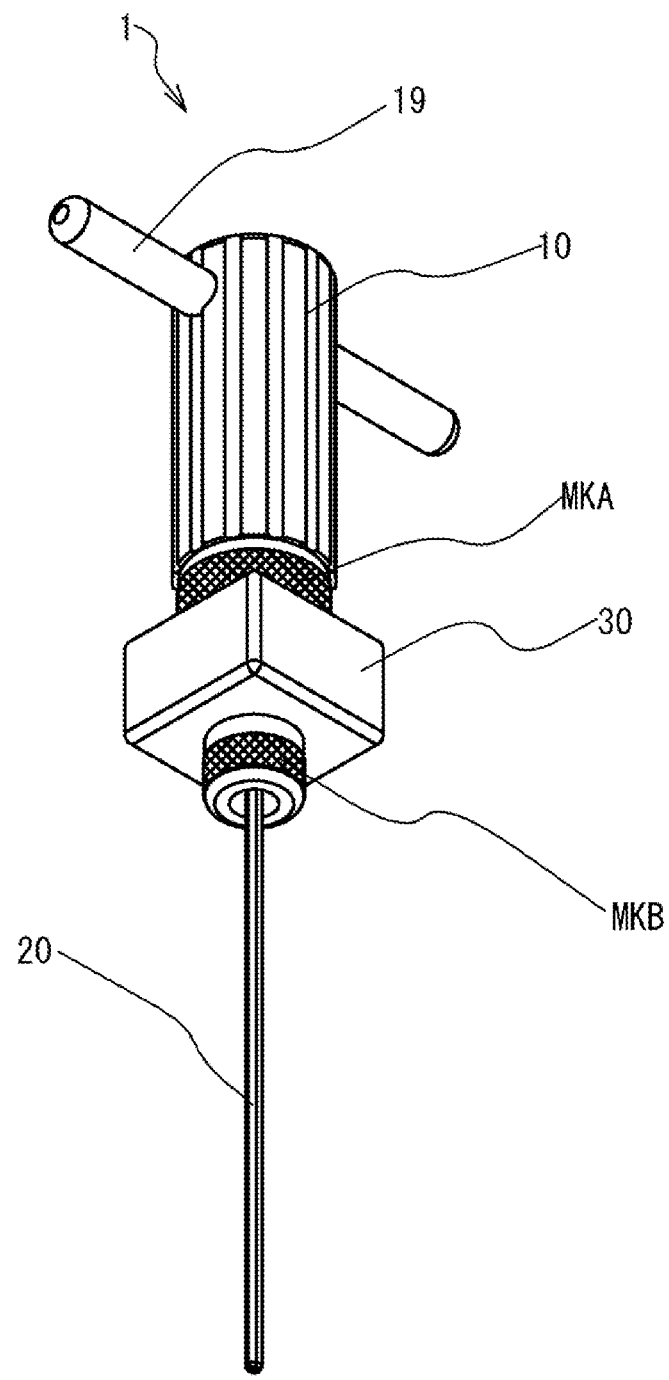

[fig.4B]
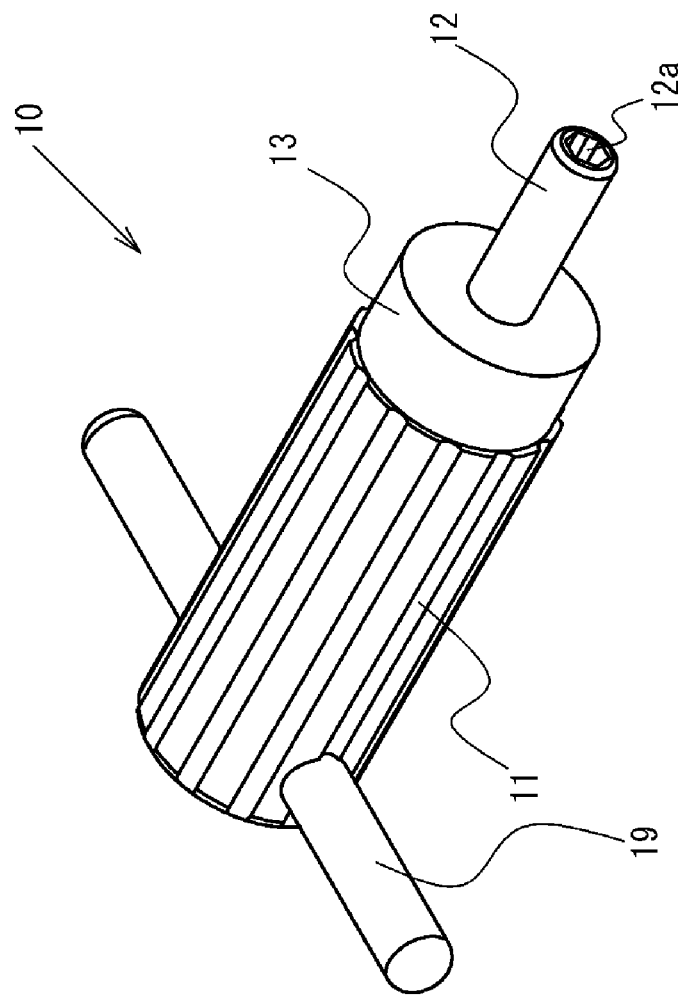

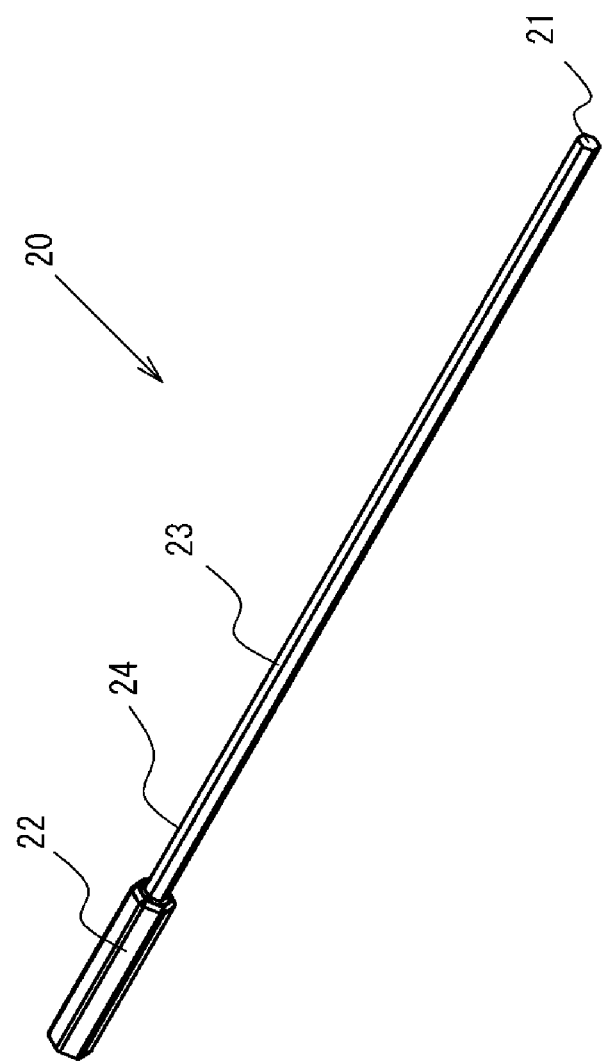

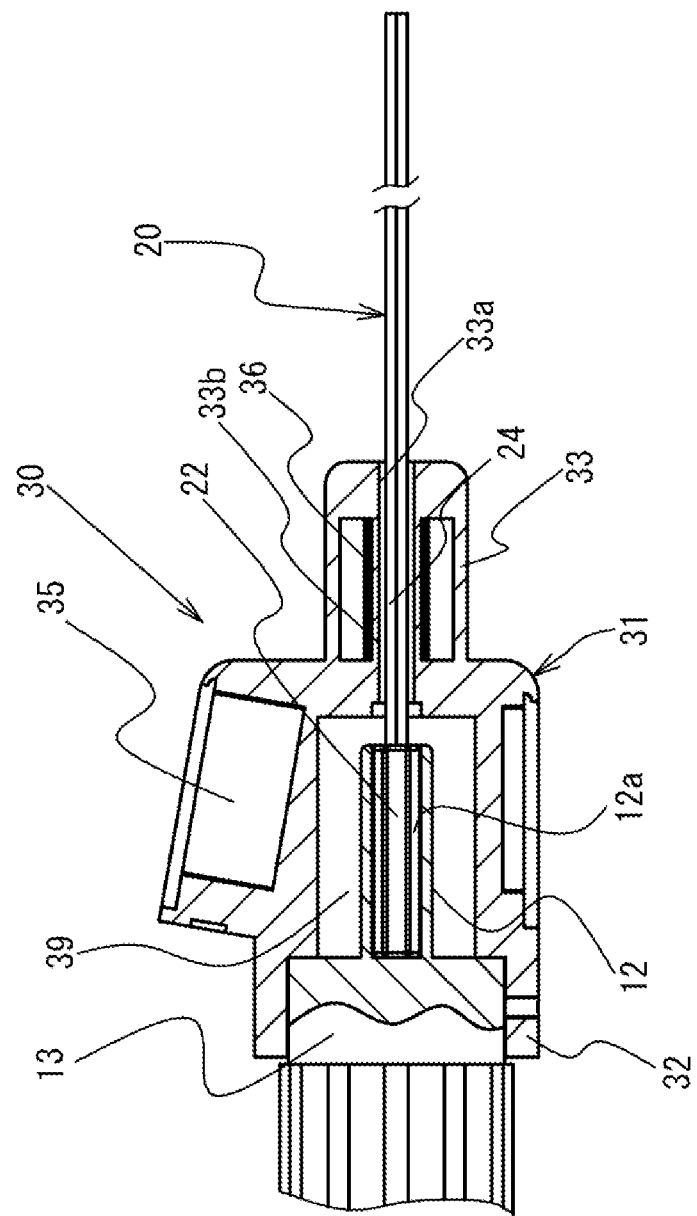
[fig.4D]

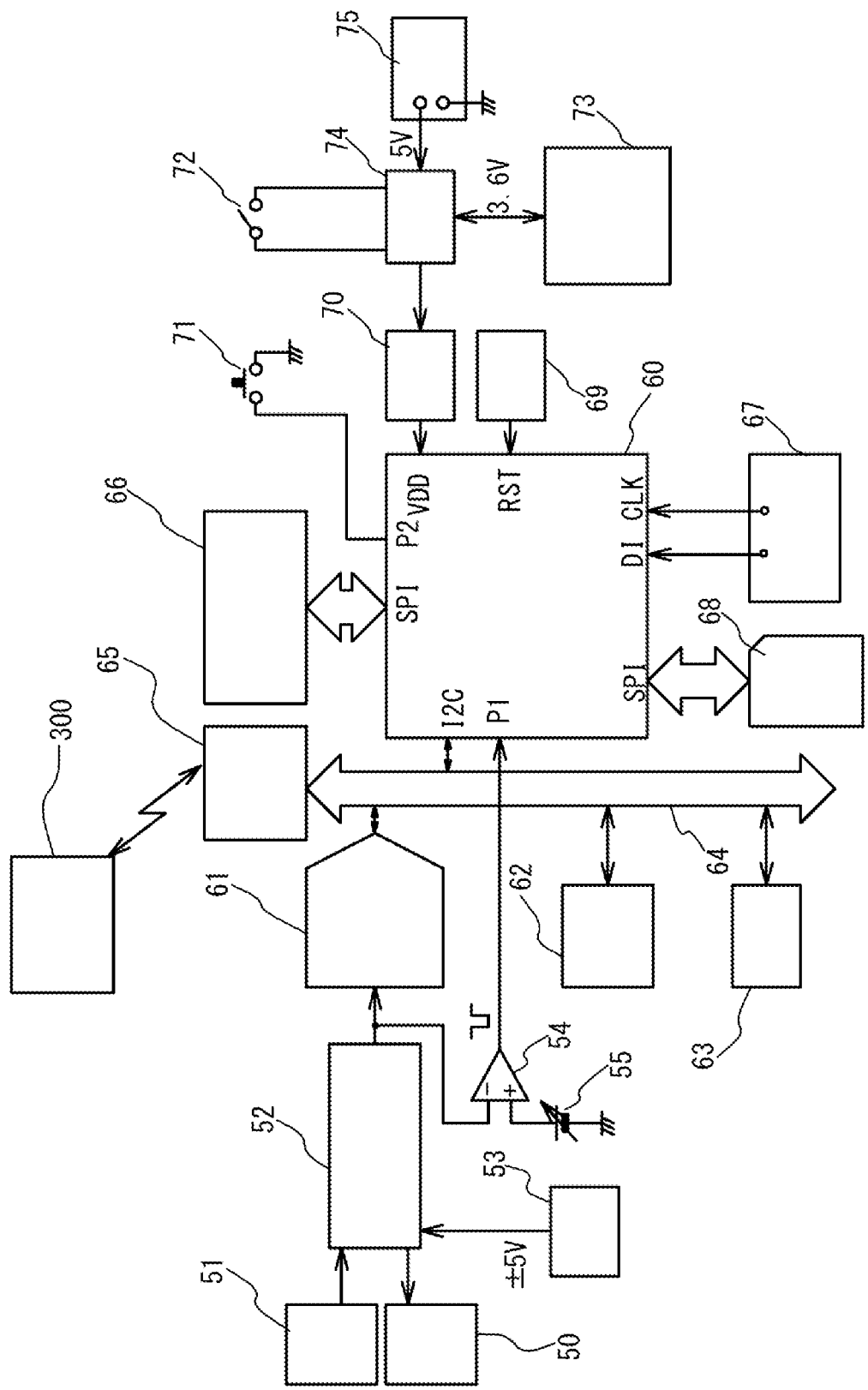
[fig.5A]

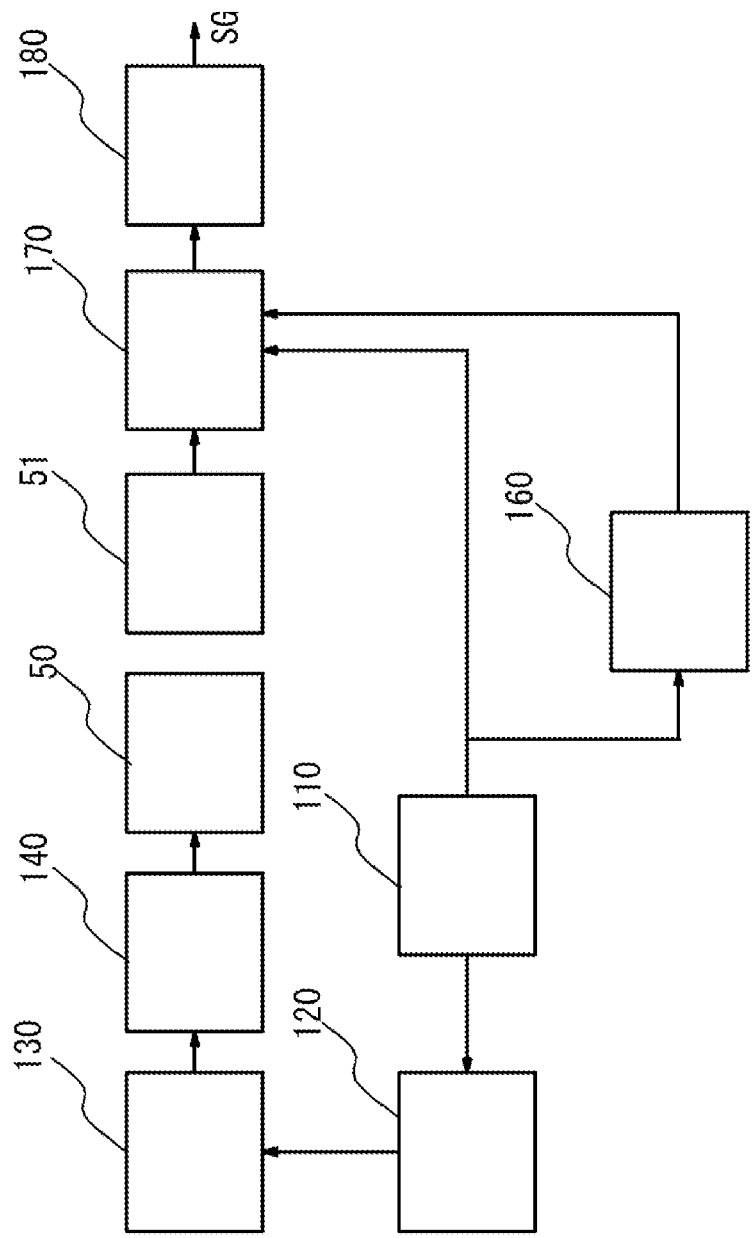
[fig.5B]

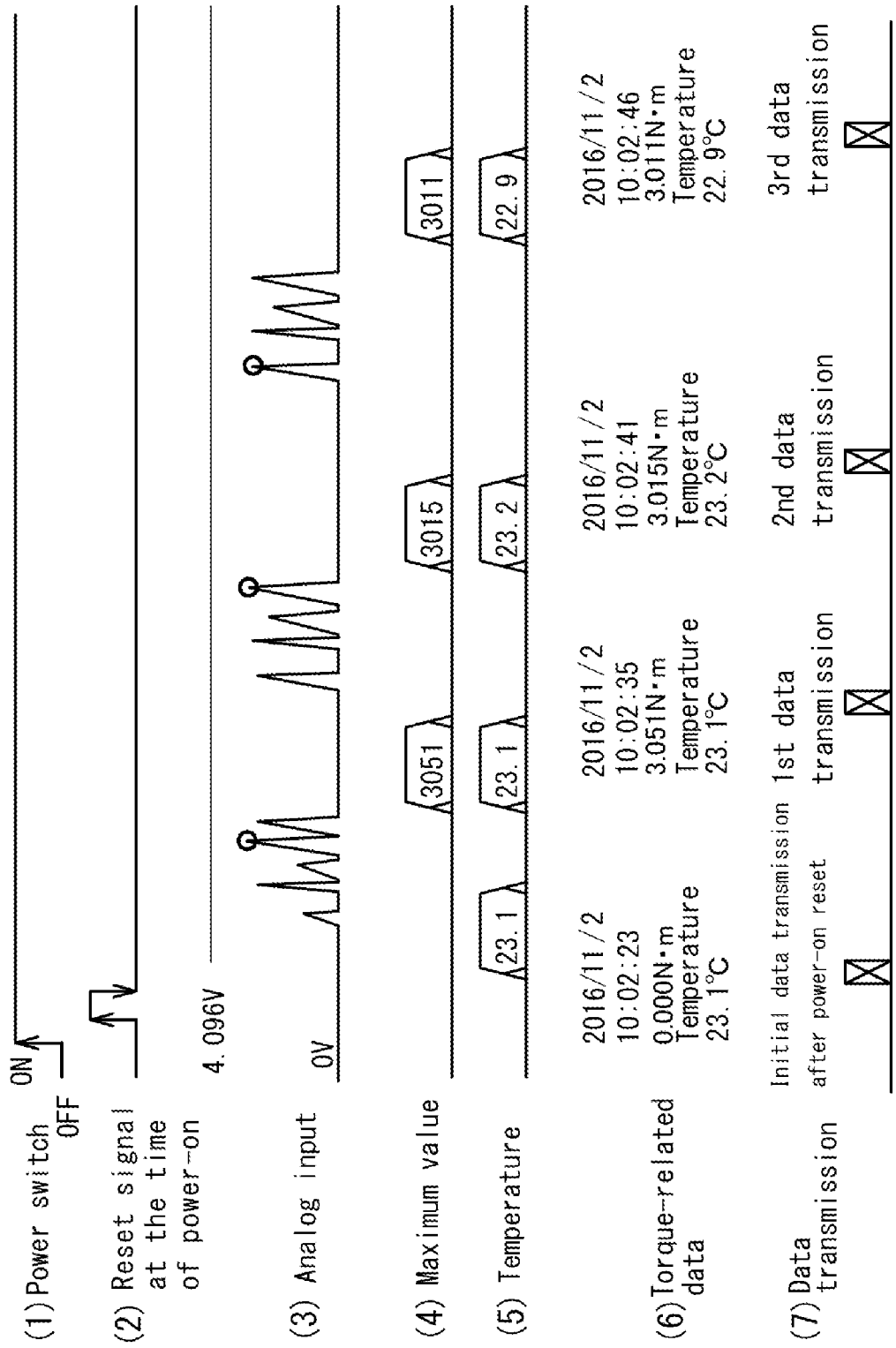

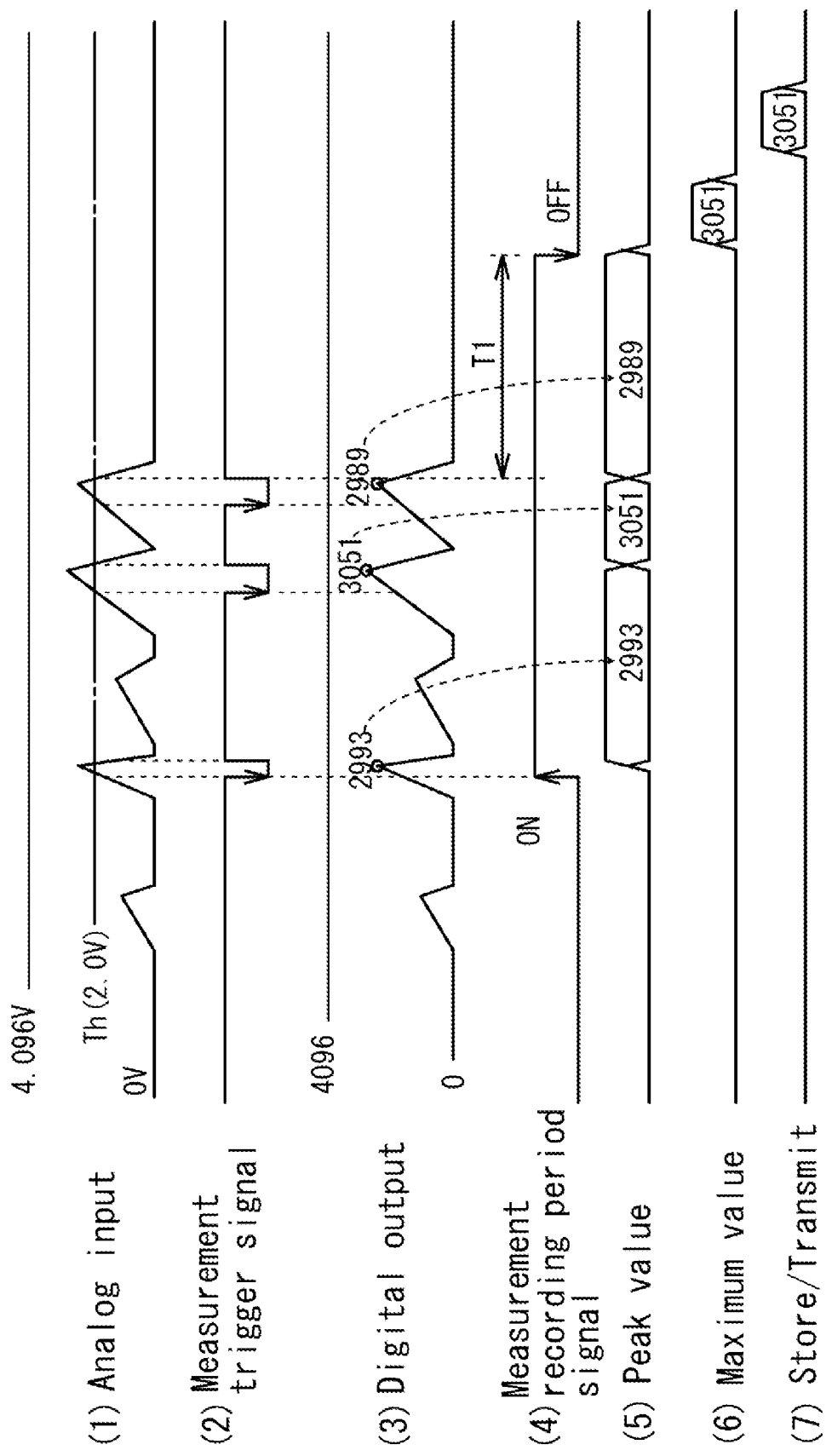

[fig.8]
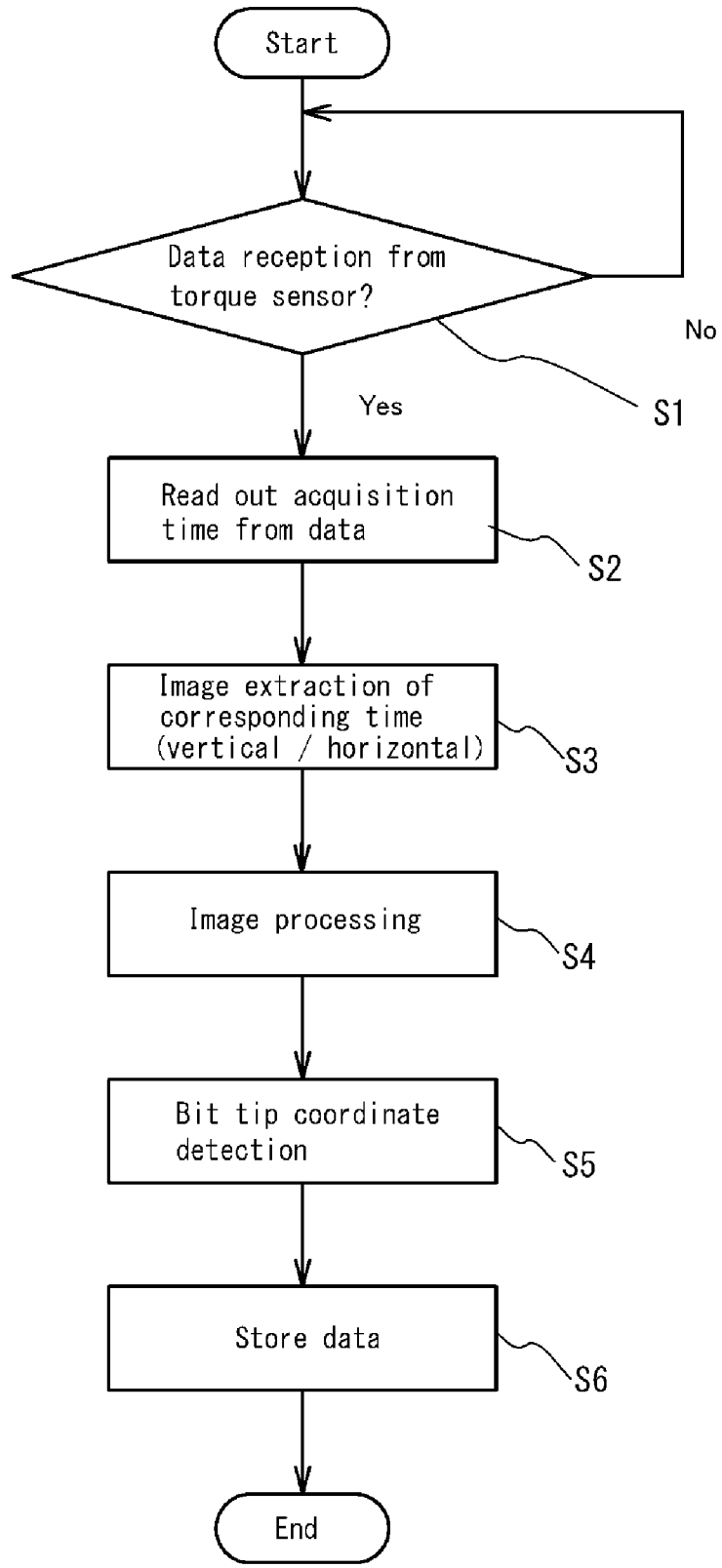

[fig.9]
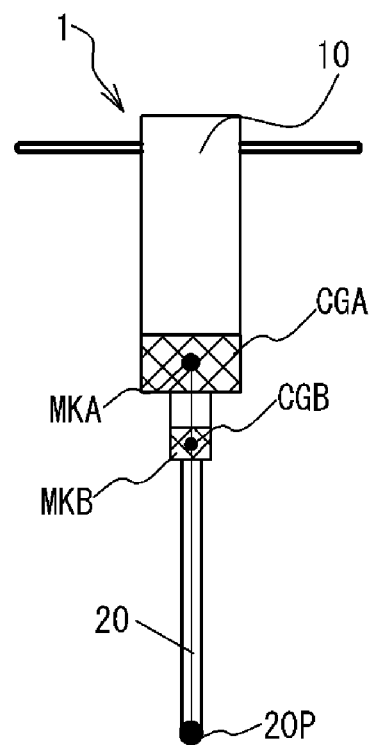

[fig.10]
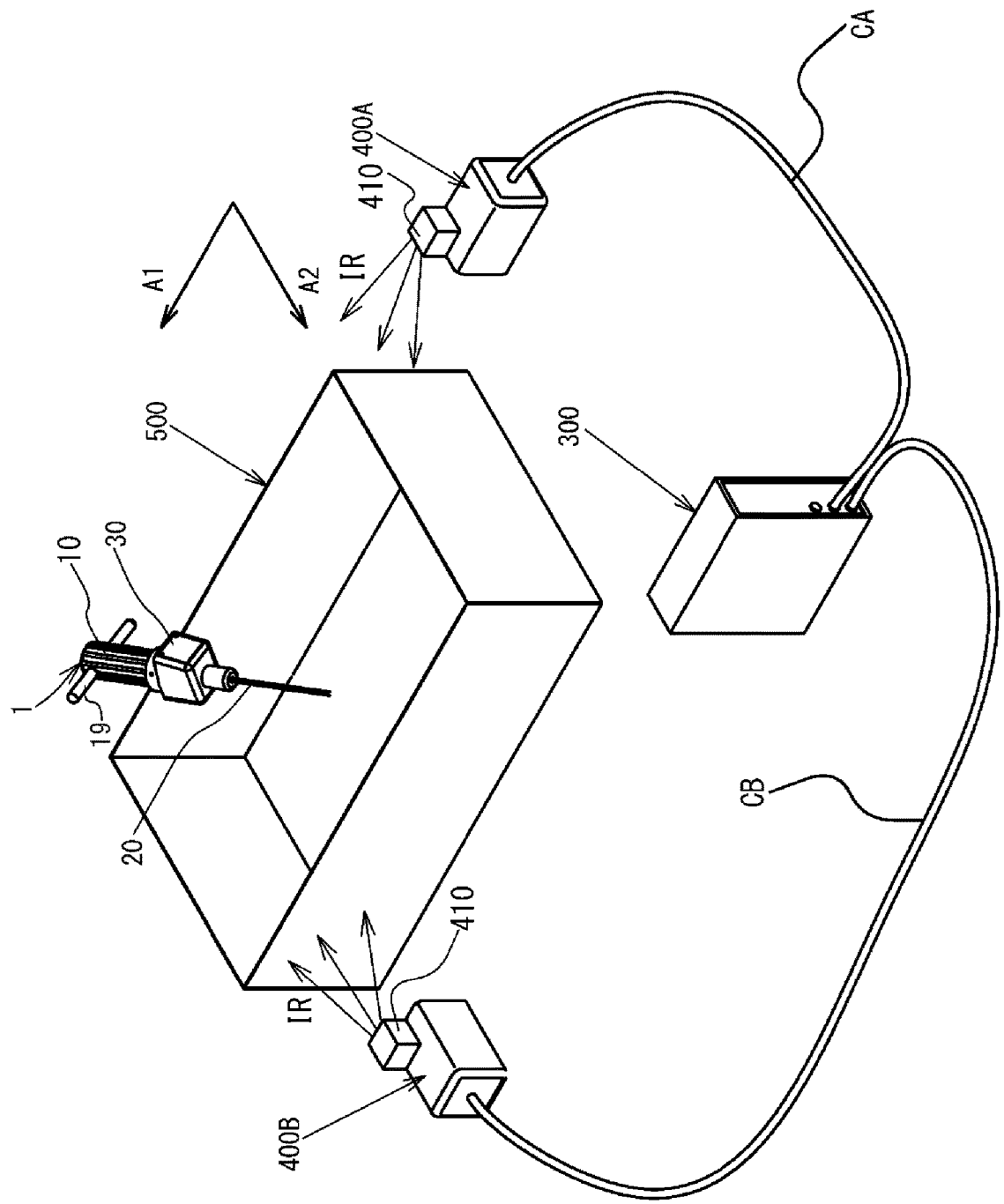

[fig.11]
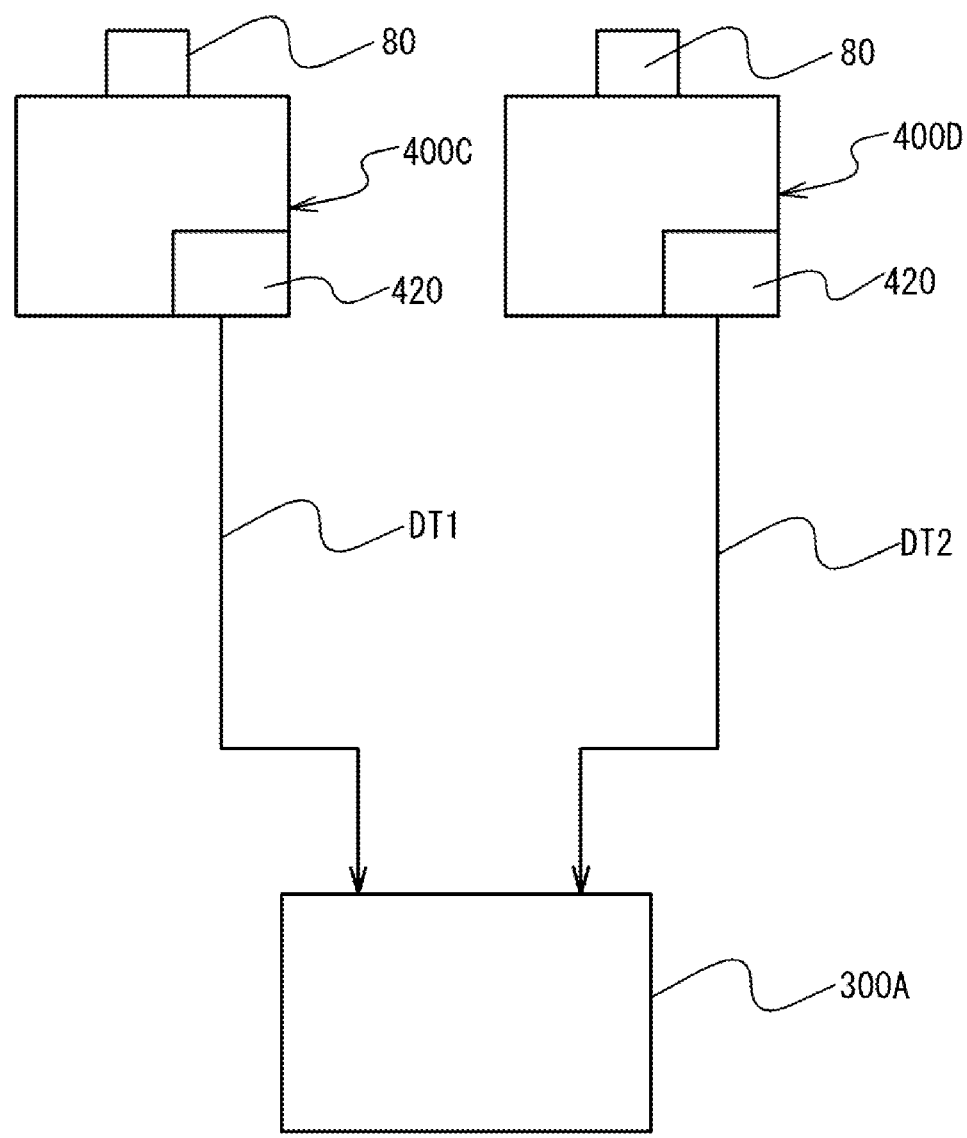

[fig.12]
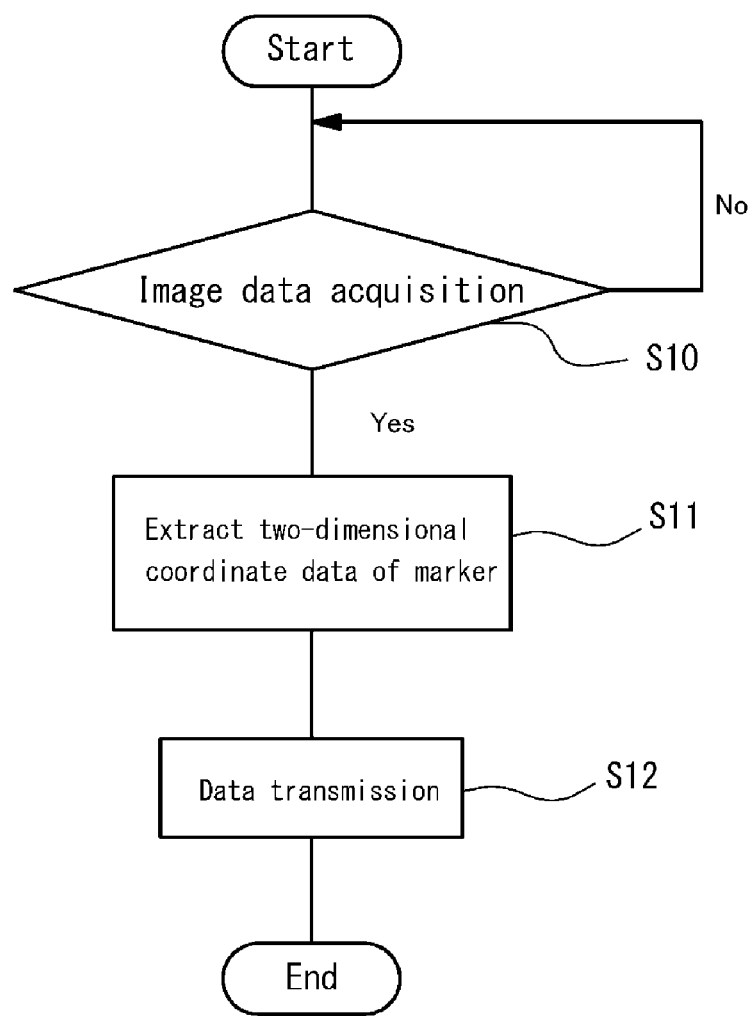

[fig.13]
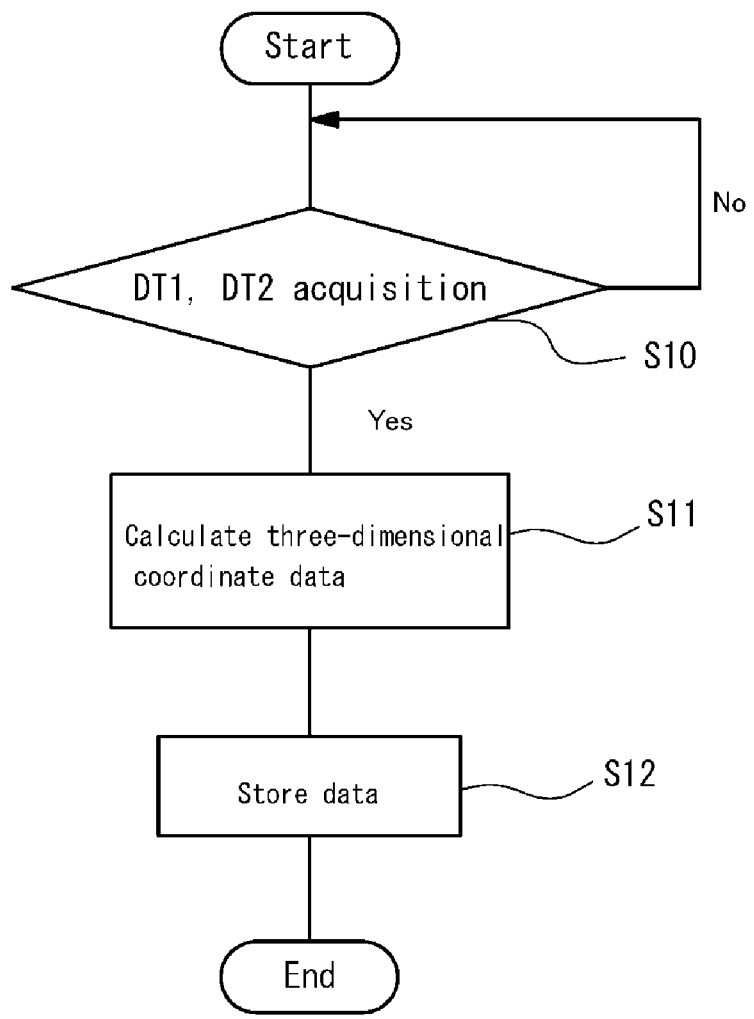

[fig.14]
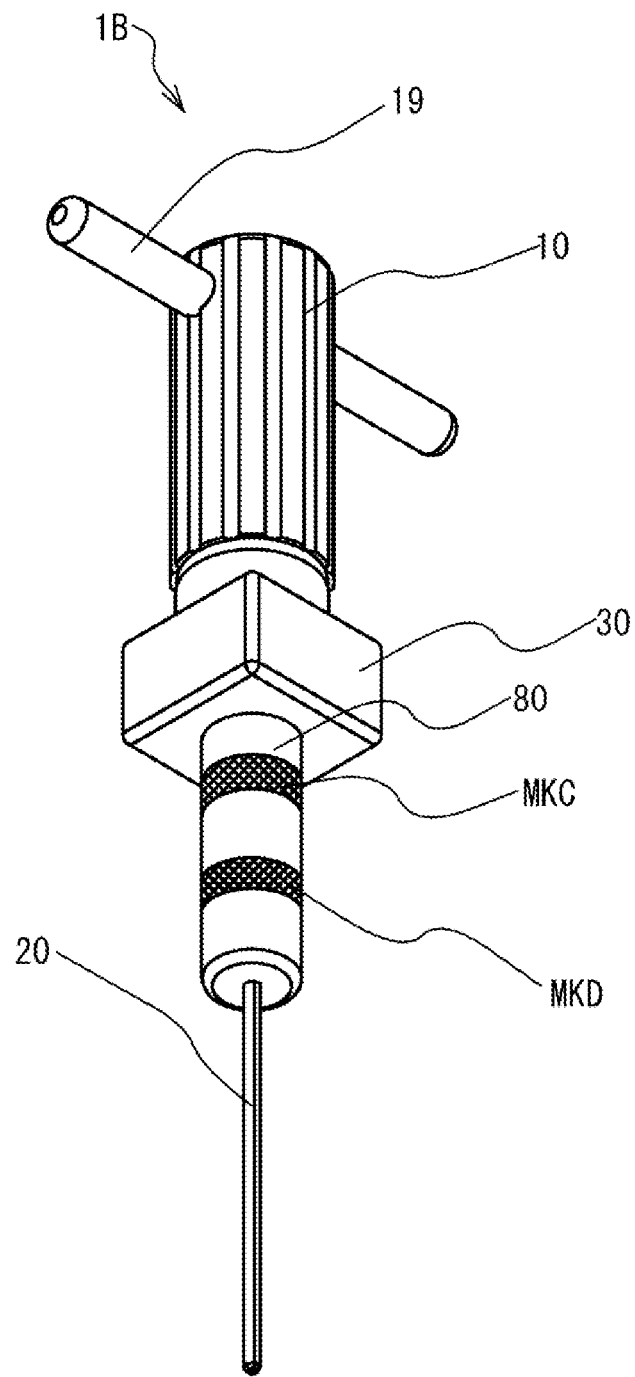

[fig.15]
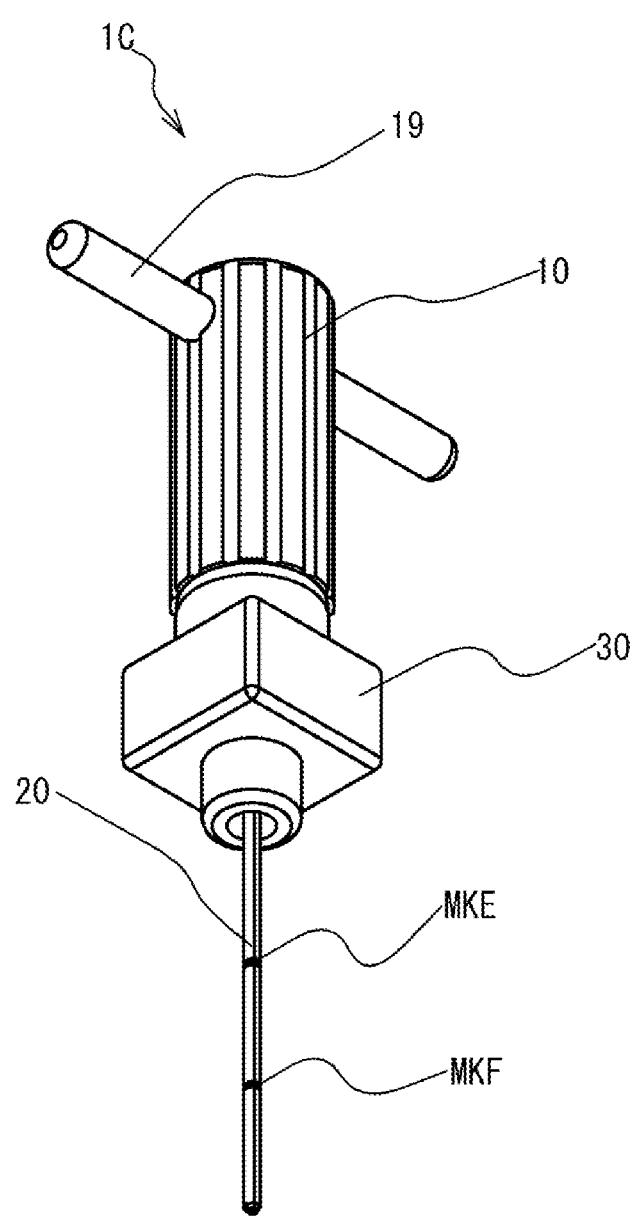

WORK MANAGEMENT APPARATUS, WORK MANAGEMENT METHOD, AND WORK MANAGEMENT SYSTEM

TECHNICAL FIELD

The present invention relates to a work management apparatus, a work management method, and a work management system for managing the tightening work of fastening parts using a tool with a torque sensor.

BACKGROUND ART

In various manufacturing processes such as a semiconductor manufacturing process, in order to supply accurately weighed process gases to processing chambers, a fluid control device (for example, see Patent Literature 1) in which various fluid devices such as open-close valves, regulators, mass flow controllers are integrated is used.

In the assembly process of the fluid control device as described above, tightening works of fastening parts such as an enormous number of hexagon socket head bolts are required, and high-quality assembly is required.

PATENT LITERATURE

PTL 1: Japanese Laid-Open Patent Application No. 2007-003013
PTL 2: Japanese Laid-Open Patent Application No. 2013-188858
PTL 3: Japanese Laid-Open Patent Application No. 2015-229210
PTL 4: Japanese Laid-Open Patent Application No. 2013-852
PTL 5: Japanese Laid-Open Patent Application No. 2008-181344

SUMMARY OF INVENTION

Technical Problem

Patent Literature 2 discloses a technique for automatically detecting the position of a fastening parts that has been tightened and managing the tightening position by utilizing signals from sensors such as an acceleration sensor, a gyro sensor, and a geomagnetic sensor provided in a torque wrench.

Patent Literature 3 discloses a technique for image-capturing a work of a tool by an imaging device and determining whether the work is performed normally based on the captured image data as well as data of a sensor such as a torque sensor attached to the tool.

Patent Literature 4 discloses a technique for detecting the presence or absence of a registered identification mark previously applied to a tightening tool when performing a tightening work to a workpiece with the tightening tool from an imaging data captured by an imaging device installed above a workpiece, and thereby detecting that the tightening work is performed.

Patent Literature 5 discloses a technique for identifying a position in a product to which a work has been performed in a product-manufacturing process comprising a plurality of works by using a tool. Specifically, as triggered by reception of a completion signal outputted when one work is completed, a plurality of images are captured, work completion coordinates representing the work completion position are detected from these images, work coordinates representing a work position which is a position where the work should be performed is obtained, and based on the work completion coordinates and the work coordinates, it is identified which of the work positions for the plurality of works the work completion position corresponds to.

The above-mentioned fluid control device is becoming more compact and integrated, and fastening parts such as bolts are also shortened and, spaces between the fluid devices are narrowed. Therefore, the tightening work of the fastening part such as a bolt is performed using a tool equipped with an elongated bit in the bit holding portion provided in the grip. For example, when tightening a fastening part at a position that is accessible only through a small space between fluid devices, only the bit portion of the tool is inserted into the narrow space, the bit tip end portion is engaged with the fastening part while the bit attitude is adjusted as appropriate, and the bit is rotated by manipulating the grip located away from fluid devices.

However, in order to provide such a tool with the function of detecting the tightening position disclosed in Patent Literature 2, a case containing various sensors, CPUs, and the like needs to be mounted. It is difficult to mount a case incorporating various sensors, CPUs, and the like on a tool composed of a grip and a bit, and even if the case is mounted on the tool, the case becomes an obstacle and the operability of the tool is remarkably lowered. Additionally, mounting a large number of sensors increases the cost of manufacturing the tool.

With the techniques of Patent Literatures 3 and 4, it is difficult to reliably image tip end portion and the tightening position of the bit inserted in the narrow space between fluid devices, and the grip of the operator's hand and the tool enters the imaging area during imaging, concealing the working position and the tightening position.

In Patent Literature 5, the working position can be determined, but actual torque data at times of tightening screws are not available. Further, it is not easy to generate an appropriate completion signal, because the worker may retighten it several times in tightening work such as screw tightening. Furthermore, it is not easy to specify the work completion only from the image because the torque to tighten one screw is relatively small, the time to tighten one screw is as short as a few seconds or less, and the distance between one screw and a screw next to it is small. Furthermore, since the image data captured by a camera is affected by disturbance light such as illumination, it has a large effect on the accuracy of the image processing.

One object of the present invention is to provide a work management apparatus, a work management method, and a work management system capable of accurately managing information such as position and tightening torque for all fastening parts in tightening work using a tool with a torque sensor.

Solution to Problem

The work management system of the present invention is a work management system for managing tightening work for tightening each of a plurality of fastening parts included in a product,
the work management system comprising: a tool comprising a torque sensor capable of detecting a tightening torque for tightening the fastening parts acting on a bit, and first and second markers for image processing; and
first and second cameras for capturing images of the product from different observation points, wherein the torque sensor starts measurement of the tightening torque when a detected tightening torque exceeds a set threshold, ends the measurement of the tightening torque when the measurement data satisfies a predetermined condition, and outputs torque-related data including a measurement time based on the measurement data between start of the measurement start and end of the measurement, an image processing unit that calculates coordinates of the engagement position of the bit that engages with the fastening part from the plurality of image data of the tool corresponding to the measurement time included in the torque-related data and including the image of the first and second markers captured by the first and second cameras during the tightening work of the fastening part; and a marker mounting device provided with the first and second markers and removably mounted to the bit.

Preferably, each of the plurality of fastening parts included in the product is arranged so that, in a tightened condition, the engagement portion for engaging the bit faces in a common direction, the image processing unit distinguishes which of the first and second markers the plurality of markers present in each image correspond to, based on the positional relationship along the common direction.

The work management method according to the present invention is a work management method that manages a tightening work for tightening each of a plurality of fastening parts included in a product using a tool equipped with a torque sensor capable of detecting a tightening torque for tightening the fastening parts acting on the bit, and a first and second markers for image processing, wherein the torque sensor starts measurement of the tightening torque when the detected tightening torque exceeds a set threshold, ends the measurement of the tightening torque when the measurement data satisfies a predetermined condition, and outputs torque-related data including the measurement time based on the measurement data between the measurement start and the measurement end; the method comprising:

capturing images of the product with first and second cameras from different observation points, receiving the torque-related data output from the torque sensor, calculating the coordinates of the engagement position of the bit engaging a fastening part from the plurality of image data of the tool corresponding to the measurement time included in the torque-related data received, and including an image of the first and second markers captured by the first and second cameras during the tightening work of the fastening part, and mounting to the bit a marker mounting device provided with the first and second markers and removably mountable to the bit.

The work management apparatus according to the present invention is a work management apparatus for managing a tightening work for tightening each of a plurality of fastening parts included in a product using a tool provided with a torque sensor capable of detecting a tightening torque for tightening the fastening parts acting on the bit and a first and second markers for image processing, wherein the torque sensor starts measurement of the tightening torque when a detected tightening torque exceeds a set threshold and ends the measurement of the tightening torque when the measurement data satisfies a predetermined condition, and outputs torque-related data including a measurement time based on the measurement data between start of the measurement and end of the measurement, the apparatus comprising a coordinate calculating unit that calculates coordinates of the engagement position of the bit based on a plurality of image data of the tool corresponding to the measurement time included in the torque-related data received and including the image of the first and second markers captured by first and second cameras during the tightening work of the fastening part, or based on a two-dimensional coordinates data of the first and second markers extracted from the image data captured by the first camera and a two-dimensional coordinate of the first and second markers extracted from the image data captured by the second camera, wherein the first and second markers are provided on a marker mounting device removably mounted to the bit.

Advantageous Effects of Invention

According to the present invention, it is possible to accurately manage information such as position and tightening torque for all fastening parts in a product such as a fluid control device.

BRIEF DESCRIPTION OF DRAWINGS

FIG. 1 is an external perspective view of a work management system according to an embodiment of the present invention.

FIG. 2 is an external perspective view showing an example of a fluid control device.

FIG. 3 is a side view of the fluid control device in FIG. 2.

FIG. 4A is an external perspective view of a tool according to an embodiment of the present invention.

FIG. 4B is an external perspective view of a grip portion.

FIG. 4C is an external perspective view of a bit. FIG. 4D is a longitudinal sectional view of a torque sensor portion of the tool.

FIG. 5A is a circuit diagram of the torque sensor.

FIG. 5B is a functional block diagram of an analog circuit portion of the torque sensor.

FIG. 6 is a timing chart showing an example of a processing of the torque sensor when performing multiple tightening works.

FIG. 7 is a timing chart showing an example of various signals in the torque sensor in one tightening work.

FIG. 8 is a flowchart showing an example of processing in the processing apparatus.

FIG. 9 is an explanatory diagram of a method for detecting a bit tip position by image processing.

FIG. 10 is an external perspective view of a work management system according to another embodiment of the present invention.

FIG. 11 is a schematic configuration diagram of a work management system according to still another embodiment of the present invention.

FIG. 12 is a flowchart showing an example of processing in the processing apparatus provided in an infrared camera in FIG. 11.

FIG. 13 is a flowchart showing an example of processing in a PC in FIG. 11.

FIG. 14 is an external perspective view of a tool according to still another embodiment of the present invention.

FIG. 15 is an external perspective view of a tool according to still another embodiment of the present invention.

DESCRIPTION OF EMBODIMENTS

Embodiments of the present invention will be described below with reference to the drawings. In the present specification and the drawings, the same reference numerals are used to denote components having substantially the same functions, and thus a repetitive description thereof is omitted.

FIG. 1 illustrates a work management system according to an embodiment of the present invention, wherein the system includes a driver 1 as a tool, a personal computer (hereinafter, referred to as PC) 300 as a processing device (image processing unit), and infrared cameras 400A, 400B as imaging devices. In FIG. 1, although the interior of the gas box 500 which is a product is omitted, a fluid control device 200 shown in FIGS. 2 and 3 is installed in a bottom surface 500b. That is, an assembly work is performed with the fluid control device 200 housed in the gas box 500. Incidentally, the arrow A1 in FIG. 1 shows a horizontal direction in the horizontal plane, the arrow A2 shows the longitudinal direction in the horizontal plane.

The Fluid control device 200 shown in FIGS. 2 and 3 is used to supply various gases to a reactor such as a semiconductor manufacturing apparatus, and on the base sheet metal BS, a fluid control assembly composed of various fluid devices 210,220,230,240,280,250 that are automatic valves and mass flow controllers arranged along the longitudinal direction, respectively, is arranged in parallel in a plurality (three rows in the drawing).

The plurality of joint blocks 260,270 arranged on the base sheet metal BS have flow paths for connecting various fluid devices. The bodies of fluid devices and joint blocks 260,270 are connected by hexagon socket head bolts BT as tightening parts.

A driver 1 is used for the tightening work of the hexagon socket head bolts BT. If various fluid devices are integrated, when tightening the hexagon socket head bolts BT, tightening may have to be performed while tilting the driver 1 with respect to the hexagon socket head bolt BT so that the bit of the fluid device does not interfere with the bit of the driver 1. It is not easy to carry out such work quickly with precise tightening torque for a number of hexagon socket head bolts BT.

Returning to FIG. 1, the infrared camera 400A has a viewpoint facing the horizontal direction A1, and is arranged at a position from where image capturing of a marker provided on the tool 1 is possible, as will be described late. The infrared camera 400B has a viewpoint facing the longitudinal direction A2, and is arranged at a position from where image capturing of the marker provided in the tool 1 is possible as will be described later. The infrared cameras 400A, 400B are capable of imaging at a predetermined frame rate, and the captured image data is transmitted to the PC300 as a radio signal and stored. Since the infrared cameras 400A, 400B are installed outside the gas box 500, during the tightening work of the hexagon socket head bolt BT with the driver 1, the tip position of the bit of the driver 1 and the hexagon socket head bolt BT may not enter the field of view of the infrared camera 400A, 400B.

The infrared cameras 400A, 400B are provided with respective infrared light sources 410 for irradiating infrared rays, and irradiate infrared rays IR toward the fluid control device 200 in the gas box 500 as a product.

In the present embodiment, in order to suppress the effect of disturbance light other than infrared light from the surroundings, the infrared cameras 400A, 400B are used for imaging the fluid control device 200. In addition, by constantly irradiating the infrared light source 410 to the fluid control device 200, the effect of the disturbance light is further suppressed.

In the present embodiment, although the infrared light sources 410 are provided in the infrared cameras 400A, 400B, it is also possible to install the infrared light sources 410 separately from the infrared cameras 400A,400B.

The structure of the driver 1 is shown in FIGS. 4A to 4D.

The driver 1 has a grip 10, a bit 20, and a torque sensor 30. The driver 1 is used for fastening the hexagon socket head bolts (fastening parts), the maximum tightening torque is used in the range of 10 Nm or less, but not limited thereto.

As fastening parts, hexagon socket head bolts, hexagon bolts, cross-recessed screws, etc. are used, but are not limited thereto.

The grip 10, as shown in FIG. 4B, is a cylindrical member made of a material such as resin, and has a main body portion 11 in which a plurality of rows of grooves for anti-slip is formed on the outer peripheral surface, a cylindrical bit holding portion 12 formed on tip end portion, and a sensor mounting portion 13 for detachably mounting the torque sensor 30 formed between the main body portion 11 and the bit holding portion 12. In the bit holding portion 12, a holding hole 12a that is a blind hole having a regular hexagonal cross section is formed, and the bit 20 is inserted into the holding hole 12a and held. An auxiliary bar 19 is provided so as to be perpendicular to the grip 10. By providing the auxiliary bar 19 on the grip 10, a larger tightening and loosening torques can be produced manually.

It should be noted that the tightening torques for the fastening parts of the fluid control device 200 need to be within predetermined ranges from the viewpoint of sealing performance and the like. Therefore, the torque sensor 30 detects whether the maximum torque has reached the specified torque, and when an excessive torque exceeding the specified torque is applied to the grip 10, the grip 10 is adapted to idle in order to prevent overtorque from being applied to the fastening parts. Further, the driver 1 generates a click sound by a ratchet mechanism in accordance with the idling of the grip 10.

As shown in FIG. 4C, the bit 20 has a base end portion 22 having a regular hexagonal cross section, which is inserted and held in the bit holding portion 12 of the grip 10 described above, a tip end portion 21 opposite to the base end portion 22, and a shaft portion 23 extending between the base end portion 22 and the tip end portion 21. The hexagonal cross-sections of the tip end portion 21 and the shaft portion 23 are formed in the same dimensions. The cross-sectional area of the tip end portion 21 and the shaft portion 23 is smaller than that of the base end portion 22. The tip end portion 21 engages with a hexagon socket of the hexagon socket head bolt. A part of the shaft portion 23 near the base end portion 22 is a monitored portion 24 which is monitored by the torque sensor 30.

The bit 20 is specifically formed of an alloy steel such as carbon steel, nickel chromium molybdenum steel, chromium vanadium steel, or the like.

A magnetostrictive material is formed on the monitored portion 24, and in order to enhance the detection sensitivity, for example, Ni (40%)-Fe (60%) is plated.

In terms of the dimensions of the bit 20, for example, the diameter of the circle inscribed in the cross section of the base end portion 22 is 10 mm or less, the diameter of the circle inscribed in the cross section of the shaft portion 23 is about 4 mm, and the total length is about 200 mm. But the dimensions are not limited to them, and are appropriately selected in consideration of workability and operability.

In the bit 20, the shaft portion 23 and the monitored portion 24 may be formed integrally or may be divided.

The torque sensor 30, as shown in FIG. 4D, has a case portion 31, a mounting portion 32, a detecting portion 33 and a circuit housing portion 35.

A through hole 33a is formed in the center of the detecting portion 33, and the bit 20 penetrates through the through hole 33a. Inside the detecting portion 33, a cylindrical coil holding portion 33b is formed so as to define a part of the through hole 33a, and a coil 36 for excitation and detection is provided on the outer peripheral surface. The outer periphery of the monitored portion 24 of the bit 20 passing through the detecting portion 33 is surrounded by the coil 36.

The case portion 31, the mounting portion 32, and the detecting portion 33 are integrally formed of a resin material, and a cavity 39 is formed inside the case portion 31. The cavity 39 can accommodate the bit holding portion 12 of the grip 10 through the mounting portion 32.

The mounting portion 32 formed in a cylindrical shape, has an inner periphery to which the sensor mounting portion 13 of the grip 10 is fitted, and is fixed to the sensor mounting portion 13 by a screw member (not shown).

As will be described later, the circuit housing portion 35 houses a hardware composed of a microcomputer, a memory, a battery, an external input/output circuit, a communication circuit, various circuits for torque detection, and the like, and operatable by a required software stored in the memory.

The driver 1 is configured so that the torque sensor 30 can be attached later in a state that the bit 20 is mounted to the grip 10. Therefore, it is possible to retrofit the torque sensor 30 to a conventionally used tool having general-purpose grip 10 and the bit 20, and to detect the torque acting on the bit 20 without impairing the workability and operability of the tool.

Although the present embodiment exemplifies a case in which the torque sensor 30 can be retrofitted, a configuration in which the torque sensor 30 is attached in advance to the grip 10 and then the bit 20 is attached to the grip 10 can also be adopted.

FIG. 5A is a circuit diagram of the torque sensor 30.

In FIG. 5A, 50 denotes an exciting coil, 51 denotes a detecting coil, 52 denotes an analog circuit for outputting a voltage proportional to the torque, 53 denotes a DC-DC converter, 54 denotes a comparator, 55 denotes a reference voltage setting circuit. 60 denotes a microcomputer, 61 denotes an analog-to-digital converter (hereinafter referred to as an ADC), 62 denotes a temperature sensor, 63 denotes a real-time clock, 64 denotes a serial bus, 65 denotes a communication module, 66 denotes a read-only memory (ROM), 67 denotes a data input terminal, 68 denotes a memory card, 69 denotes a reset IC, 70 denotes a DC-DC converter, 71 denotes a calibration switch, 72 denotes a power switch, 73 denotes a battery, 74 denotes a charge control circuit, and 75 denotes a charge connector.

Here, a functional block diagram of the analog circuit portion of the excitation coil 50, the detection coil 51, and the analog circuit 52 is shown in FIG. 5B.

The torque sensor 30 includes an oscillator circuit 110, a buffer amplifier 120, a phase adjusting circuit 130, a V-I converter 140, an inverter 160, a synchronous detection circuit 170, and an inverting amplifier 180. (Excitation side)

The oscillator circuit 110 generates a reference frequency signal (e.g., 100 kHz) for exciting the excitation coil 50.

Although the signal is output as a sine wave from the oscillator circuit 110 to the excitation side circuit, it is output to the phase adjusting circuit 130 via the buffer amplifier 120 in order to make the oscillator circuit 110 operate stably.

The phase adjusting circuit 130 adjusts the phase of the waveform, and outputs to the V-I converter 140.

The V-I converter 140 converts the input voltage to a current and outputs it to the excitation coil 50. (Detection side)

The detection coil 51 outputs an induced voltage generated by a reverse magnetostrictive effect to the synchronous detection circuit 170.

From the oscillator circuit 110 to the detection side, a square wave is output as a reference signal. The frequency of the square wave is the same as that of the sine wave output to the excitation side. The output square wave is branched into two, one is output to the synchronous detection circuit 170 as it is, and the other is inverted in the phase in the inverter 160 and output to the synchronous detection circuit 170.

The synchronous detection circuit 170 synchronously detects the induced voltage from the detection coil 51 with reference to the reference signal, and outputs the induced voltage to the inverting amplifier 180.

The inverting amplifier 180 averages the output from the synchronous detection circuit 170, performs offset adjustment, gain adjustment, and outputs to ADC61 as an analog torque signal SG. The synchronous detection circuit 170 and the inverting amplifier 180 constitute the analog circuit 52 described above.

As described above, in the torque sensor 30, a torque change acting on the monitored portion of the bit is detected by the excitation coil 50 and the detection coil 51 as a change in the permeability of the magnetostrictive material forming the bit 20.

Measurement of the torque that is being tightened to the fastening part by using bit 20 is possible by detecting a torque acting on the bit.

To detect the torque acting on the bit, although utilizing the reverse magnetostrictive effect, it is necessary to convert the permeability change of the surface of the shaft (monitored portion) due to the applied torque into an impedance change of the solenoid coil surrounding the shaft (monitored portion) and detect it as a non-equilibrium voltage of the bridge circuit.

The relationship between the stress (strain) acting on the surface of the shaft (monitored portion) and the diameter of the shaft (monitored portion) is expressed by the following equation.

$$\sigma = 16T/(\pi D^3)$$

Here σ is the stress (strain) on the surface of the shaft (monitored portion), T is the torque acting on the shaft (monitored portion), and D is the diameter of the shaft (monitored portion).

That is, when the same torque is applied to bits with different diameters of the shaft (monitored portion), the stress (strain) on the surface of the shaft (monitored portion) is significantly larger for bits with a smaller diameter of the shaft (monitored portion).

The stress (strain) on the surface of the shaft (monitored portion) changes the permeability of the surface of the shaft (monitored portion).

The change in permeability occurs when the orientation of micro magnets composed of atomic sizes changes in response to a force from the outside, but no further change occurs when the orientations of the micro magnets are completely aligned (saturation state).

To precisely detect the torque applied to the bit (axis), it is desirable that the change in permeability is linear in the range of torque applied.

The microcomputer 60 transmits and receives various digital data to and from the ADC 61, the temperature sensor 62, the real-time clock 63, and the communication module 65 via the serial bus 64.

The communication module 65 transmits and receives data to and from the PC.

The ROM66 stores correction value data and calibration data so that the microcomputer 60 can read them.

The data input terminal 67 is provided for inputting a program or a clock signal to the microcomputer 60.

An analog torque signal is input to the one input terminal of the comparator 54, a reference voltage (threshold) is input to the other input terminal from the reference voltage setting circuit 55, and when the torque signal exceeds the reference voltage, as will be described later, a measurement trigger signal is output to the P1 terminal of the microcomputer 60.

Next, with reference to FIGS. 6 and 7, the operation of the circuit of the torque sensor 30 will be described. Incidentally, FIG. 6 is a timing chart showing the operation of the torque sensor 30 when tightening a plurality of bolts BT in order, FIG. 7 is a timing chart showing in more detail the operation of the torque sensor 30 in the first torque measurement of FIG. 6.

The above-mentioned ADC61 is composed of, for example, 12 bits, and can output a signal in the range of 0 to 4.096V when 1 mv is 1 bit. In this embodiment, the set threshold Th is, for example, initially set to 2.0V by the reference voltage setting circuit 55.

When the power switch 72 shown in FIG. 5A is turned on (conduction state) as shown in (1) in FIG. 6, a reset signal from the reset IC69 to the microcomputer 60 is input as shown in (2) in FIG. 6.

When the voltage of the torque signal (analog input) by tightening one of the hexagon socket head bolts BT of the fluid control device 200 with the tool 1 exceeds the set threshold Th (FIG. 7 (1)), a measurement trigger signal is generated from the comparator 54 and is input to the P1 terminal of the microcomputer 60.

In the microcomputer 60, when the measurement trigger signal is input to the P1 terminal, the measurement recording period signal (FIG. 7 (4)) is turned on. When the measurement recording period signal is turned on, the microcomputer 60 starts recording (sampling) of the digital output of ADC61 of the torque signal (FIG. 7 (3)).

The microcomputer 60 detects the read digital output and stores it (FIG. 7 (5)).

When the analog input falls below the set threshold Th, the measurement trigger signal is turned off (FIG. 7 (2)), and the recording of the digital output of ADC61 of the torque signal is stopped. When the analog input falls below the set threshold Th and a preset set time T1 (e.g., 0.5 seconds) elapses, the measurement recording period signal is turned off (FIG. 7 (4)). Thus, the measurement of the tightening torque of one bolt BT is completed.

In the example of FIG. 7, three peak values 2993, 3051, and 2989 of the digital output are detected. Then, the microcomputer 60 detects the maximum value (3051) of the three peak values (FIG. 7 (6)). In the present embodiment, the maximum value of the peak value is set as the tightening completion torque of the torque sensor 30.

Then, as will be described later, the torque-related information including the maximum value of the torque is formed, and the torque-related information including the maximum value is stored in the memory card 68 and transmitted to PC 300 through the communication module 65.

Returning to FIG. 6, the maximum value of the torque signal for each tightening work is detected (FIG. 6 (3), (4)), the temperature at the time of measurement of each torque signal is detected (FIG. 6 (5)), and as shown in (7) in FIG. 6, a torque-related data is formed. Specifically, the torque-related data includes the measurement time (measurement date and time), the value obtained by converting the maximum value (peak value) of the torque signal to the actual torque value, and the temperature at the time of measurement. In the torque-related data, the data of the torque value is zero at the time of power-on, and is 3.051N·m for the first time, 3.015N·m for the second time, and 3.011N·m for the third time.

Next, referring to FIG. 8, an exemplary process in PC 300 will be described.

PC 300 constantly monitors whether it has received the torque-related data from the torque sensor (step S1), and when received, reads out the measurement time (date and time) at which the torque is measured from the torque-related data (step S2).

PC 300 includes frame buffers for recording images from the infrared cameras 400A,400B, and the images of the tightening work are stored in PC 300 as the work progresses. The image data stored in PC 300 is traced back, and the image data captured by the infrared-cameras 400A,400B corresponding to the time read in step S2 is extracted (step S3). That is, these two images are images of the driver 1 when the tightening of the bolt BT is completed. These image data are processed (step S4), and as shown in FIG. 9, the center of gravity positions CGA and CGB of the images of the marker I and the marker MKB provided in the driver 1 are detected. The coordinates 20P of the tip of the bit 20 exist on a straight line connecting the center of gravity positions CGA and CGB. As a result, the coordinates of the tip of the bit 20 are detected (step S5). In the present embodiment, the markers MKA and MKB are green, which is less susceptible to disturbance from the surrounding environment.

Further, a retroreflective material (retroreflective ink) is used as a material for forming the marker MKA and the marker MKB. Thus, it is possible to increase the visibility from the light source direction by retroreflection.

Next, the detected data such as the tip coordinates of the bit 20, the temperature data, the tightening completion torque value, and the like are recorded in the storage device in association with each other (step S6). This makes it possible to always accurately trace working information such as the presence or absence of tightening works of all bolts BT in the fluid control device 200 and tightening torques.

It is assumed that several tightening works are performed on the bolts at the same location, in such a case that an existing fluid device of the fluid control device 200 is replaced with a new fluid device after a tightening work. When the tip end coordinates of the bit 20 calculated in S6 and the data such as the tightening completion torque value are recorded in the storage device in association with each other, it is determined whether or not the preceding data at coordinates the same as or approximate to the detected leading tip coordinates 20P of the bit 20 exist, and when the preceding data exists, the data whose tightening completion torque value is relatively higher is recorded as the preferential value. However, the data having the lower tightening completion torque value is also recorded together with other data without performing deletion or overwriting. That is, it is determined whether existing data exists for the same or approximate coordinates, and if present, when recording them in the storage device, it is recorded separately.

The operator may be authorized to delete the data recorded in step S6. This is to cope with a case where a construction failure or the like occurs. In addition, when the operator deletes the data, it is possible to record the history of the data deletion.

Incidentally, a plurality of bolts BT included in the gas box 500 is arranged so that the hexagon socket head bolts BT to engage tip end portion of the, bit 20 face the common direction when they are tightened. Using this arrangement, in the image processing in PC300, the marker MKA and the marker MKB are distinguished from each other. in order to distinguish which of the markers MKA and MKB corresponds to a plurality of markers shown in images captured by the cameras 400A,400B, the processing load increases and the real-time property is impaired if processing for distinguishing the markers by shapes or the like is provided.

Therefore, in the present embodiment, whether the plurality of markers existing in each image correspond to the marker MKA or the marker MKB is distinguished based on the positional relationship along the common direction in which the bolt BT faces. Specifically, among the plurality of markers in the image, in the common arrangement direction of the bolt BT, the marker projecting on the side relatively close to the bolt BT is recognized as the marker MKB, and the marker projecting on the relatively far side to the bolt BT is recognized as the marker MKA. Thus, it is unnecessary to detect the direction of the bit 20, and it is unnecessary to perform a process of distinguishing between a plurality of markers by the difference in the shape of the marker or the like.

In the present embodiment, as described above, while always capturing the image data for acquiring the tip coordinates of the bit, the torque-related data acquired from the torque sensor 30 is acquired independently of the image data. By associating the acquired torque-related data with the tip coordinate data of the bit 20 obtained from the image data temporally matching the torque-related data, accurate work information can be acquired.

For example, if the sequence is such that a completion signal is generated after completion of a tightening work by the tool and imaging of the tool is started as triggered by the completion signal and the position coordinates of the tool or the like is calculated by processing the image data captured, there is a gap between the time when the work is completed and the time when the position coordinates of the tool or the like are calculated, and the calculated position coordinates are not necessarily the position coordinates of the tool or the like when the work is completed.

In the present invention, since there is no temporal deviation between the calculated tip coordinate data of the bit 20 and the acquired torque-related data, more accurate work data can be obtained.

Second Embodiment

FIG. 10 shows a work management system according to another embodiment of the present invention.

In the system shown in FIG. 10, PC300 and infrared cameras 400A,400B are connected by communication cables CA, CB. In this manner, the image of a driver 1 can be acquired even if the image is wired instead of wireless.

In terms of installation positions of the infrared cameras 400A, 400B, when two cameras are employed as in the above embodiment, it is desirable that the viewpoint direction of the infrared camera 400A and the viewpoint direction of the infrared camera 400B are orthogonal to each other. The imaging area may be optionally selected as long as the marker MKA and the marker MKB provided in the driver 1 are imaged from the start of the operator's work until the completion of tightening of all hexagon socket head bolts (fastening parts) of fluid control device 200. The entire body of the operator or the gas box 500 need not be imaged.

In the above embodiment, the maximum value of the peak value of the torque signal is transmitted from the driver 1 to PC300, but the present invention is not limited to this. For example, in addition to the maximum value of the peak value, the first peak value or the last peak value can also be used as a tightening completion torque, it is also possible to adopt the average value of the peak value.

In the above-described embodiment, the measurement data of the tightening torque is recorded in the driver 1 and transmitted to PC300, but the configuration may be such that the driver 1 does not record the measurement data but only transmits the measurement data, and PC300 records and detects the peak value.

In the above embodiment, the captured image data is stored in a frame buffer, necessary image data is extracted from the frame buffer, and coordinate data is calculated by image processing, but the present invention is not limited to this. It is also possible to store all the captured image data in the storage device and search an image data corresponding to the torque-related data from the stored image data.

It is also possible to extract the coordinates of the marker for each captured image data to calculate the tip coordinate data of the bit 20, and to store them as time-series data.

Third Embodiment

FIG. 11 shows a work management system according to still another embodiment of the present invention.

The work management system according to the present embodiment includes two infrared cameras 400C, 400D and a PC 300A, and other configurations are the same as those of the work management system of the first embodiment.

The two infrared cameras 400C, 400D are provided with respective processing devices 420 for image processing. The processing device 420 employs a processor for image processing, but it is also possible to use a general-purpose processor.

FIG. 12 shows an example of processing of the processing device 420, and FIG. 13 shows an example of processing in PC 300A. The processing routines in FIGS. 12 and 13 are executed at predetermined time intervals.

The processing device 420 determines whether it has acquired the image data captured by the infrared camera 400C or 400D (step S10), and if it has acquired, extracts the two-dimensional coordinates of the marker MKA and the marker MKB included in the acquired image data (step S11), extracts the imaging time data of the image data and transmits the data to the PC 300B (step S12). This process is performed in infrared cameras 400C, 400D.

The PC300A determines whether or not the data DT1 including the two-dimensional coordinate data of the markers MKA and MKB from the infrared camera 400C and the data DT2 including the two-dimensional coordinate data of the markers MKA and MKB from the infrared camera 400D imaged at the time corresponding to the data DT1 has been acquired (step S20), and when acquired, calculates the three-dimensional coordinate data of the markers MKA and MKB and the tip coordinate data of the bit 20 from the two data DT1, DT2 (step S21), and stores this data together with the imaging time data and the like (step S22). In the PC300A, because the tip coordinate data of the bit 20 is stored rather than the image data, consumption of the capacity of PC300A storage device is relatively small. As a result, it is possible to calculate and store the tip coordinate data of the bit 20 for all the image data.

In the present embodiment, the process of calculating and storing the tip coordinate data of the bit 20 has been described, but it is needless to say that the process of associating the torque-related data acquired by PC300A with the tip coordinate data of the bit 20 temporally matching the torque-related data can also be performed at the same time as in the first embodiment.

Fourth Embodiment

FIG. 14 shows another example of the tool. In the assembly work of the fluid control device 200, a plurality of differently sized bits 20 are used and replaced with various bits 20. Therefore, the attitude of the bit 20 may slightly change with respect to the bit holding portion 12, and when the attitude of the bit 20 changes with respect to the bit holding portion 12, the relative positions of the bit 20 with respect to the markers MKA and MKB also change. This relative position change also affects the tip coordinate data of the bit 20.

Therefore, the driver 1B as a tool shown in FIG. includes a marker mounting member 80 which is removably mounted to the bit 20. The marker mounting member 80 is a cylindrical member, and the bit 20 is adapted to fit in the central portion thereof. Markers MKC, MKD are provided at two locations on the outer peripheral surface of the marker mounting member 80.

By mounting the marker mounting member 80 to the bit 20, it is possible to prevent the occurrence of a change in the relative position between the markers MKC, MKD and the bit 20.

In the present embodiment, the marker mounting member 80 has a cylindrical shape, but is not limited thereto, and the marker forming position may project from the marker mounting member 80, and the configuration may be variously modified.

FIG. 15 shows still another example of the tool.

In the driver 1C as a tool shown in FIG. 15, markers MKE, MKF are formed at two positions of the bit 20. According to this configuration, it is possible to prevent the occurrence of a change in the relative position between the markers MKE, MKF and the bit 20.

In each of the embodiments described above, the case where the markers are provided at two positions of the tool has been exemplified, but the present invention is not limited to this, and it is also possible to provide the markers at three or more positions.

In the embodiment described above, the case of constantly imaging fluid control device 200 with two infrared cameras 400A, 400B has been exemplified, but the configuration is not limited thereto, and the imaging may be started at any time on or before the start of the measurement by the torque sensor 30 at the latest. For example, a measurement start signal may be generated from the torque sensor 30, and imaging by the infrared cameras 400A, 400B may be started accordingly.

The above-described assembly work of the fluid control device 200 by using one driver 1 as a tool is exemplified, but the present invention is not limited to this. The assembly of the fluid control device 200 is typically performed in concert by a plurality, e.g., two persons. In this case, each worker works by using the driver 1. Each driver 1 is commonly imaged by the cameras 400A, 400B, the signals output from each torque sensor 30 is input to a common processing device 300 and processed. Each torque sensor 30 outputs a unique identification information together with the torque information or the like, so as to enable processing of the coordinate information and torque-related information of the plurality of drivers 1 in a common processing device 300.

Reference Signs List

1: Driver (tool)
1B: Driver (tool)
1C: Driver (tool)
10: Grip
11: Main unit
12: Bit holding portion
12a: Retention hole
13: Sensor mounting portion
19: Auxiliary bar
20: Bit
20P: Tip coordinate
21: Tip end portion
22: Base end portion
23: Shaft portion
24: Monitored portion
30: Torque sensor
31: Case portion
32: Mounting portion
33: Detection portion
33a: Through hole
33b: Coil holding portion
35: Circuit housing portion
36: Coil
39: Cavity
50: Excitation coil
51: Detection coil
52: Analog circuit
54: Comparator
55: Reference voltage setting circuit
60: Microcomputer
62: Temperature sensor
63: Real-time clock
64: Serial bus
65: Communication module
66: ROM
67: Data input terminal
68: Memory card
69: Reset IC
72: Power switch
80: Marker mounting member (marker mounting device)
110: Oscillator Circuit
120: Buffer amplifier
130: Phase adjusting circuit
140: V-I converter
160: Inverter
170: Synchronous detection circuit
180: Inverting amplifier
200: Fluid control device
260,270: Joint block
280: Fluid device
300: Processing device
400A-400D: Infrared camera
410: Infrared light source
420: Processing device
500: Gas box
500b: Bottom surface A1: Horizontal direction
A2: Longitudinal direction
BS: Base sheet metal
BT: Hexagon socket bolt
CA, CB: center of gravity position
IR: infrared light
MKA-MKF: Marker
T1: Set time
Th: Set threshold

The invention claimed is:

1. A work management system for managing tightening work for tightening each of a plurality of fastening parts included in a product, the work management system comprising: a tool comprising a torque sensor capable of detecting a tightening torque for tightening the fastening parts acting on a bit, and first and second markers for image processing; and first and second cameras for capturing images of the product from different observation points, wherein the torque sensor starts measurement of the tightening torque when a detected tightening torque exceeds a set threshold, ends the measurement of the tightening torque when the measurement data satisfies a predetermined condition, and outputs torque-related data including a measurement time based on the measurement data between start of the measurement start and end of the measurement, an image processing unit that calculates coordinates of the engagement position of the bit that engages with the fastening part from a plurality of image data of the tool corresponding to the measurement time included in the torque-related data and including the image of the first and second markers captured by the first and second cameras during the tightening work of the fastening part; and a marker mounting device provided with the first and second markers and removably mounted to the bit.

2. The work management system according to claim 1, wherein each of the plurality of fastening parts included in the product, in a tightened state, is arranged so that the engagement portion for engaging the bit faces in a common direction, wherein the image processing unit distinguishes which of the first and second markers the plurality of markers present in each image correspond to, based on a positional relationship along the common direction.

3. The work management system according to claim 1, wherein the first and second cameras are infrared cameras.

4. The work management system according to claim 1, wherein the image processing unit comprises: a first image data processing unit that extracts two-dimensional coordinates of the first and second markers included in the image data captured by the first camera;

a second image data processing unit that extracts two-dimensional coordinates of the first and second markers included in the image data captured by the second camera; and a bit coordinate calculation unit that calculates the coordinates of the engagement position of the bit based on the two-dimensional coordinate data of the first and second markers extracted by the first image data processing unit and the second image data processing unit, respectively;

wherein the first and second image data processing units are provided in the first and second cameras, respectively.

5. The work management system according to claim 1, further comprising an infrared light source for irradiating the product with infrared light.

6. The work management system according to claim 5, wherein the infrared light sources are provided in the first and second cameras, respectively.

7. The work management system according to claim 1, wherein the first and second markers are formed of a retroreflective material.

8. The work management system according to claim 1, wherein the first and second cameras start imaging at the latest before the start of measurement of the torque sensor.

9. The work management system according to claim 1, wherein the product is a fluid control device, the fluid control device includes a plurality of fluid device columns comprising a plurality of fluid devices arranged in one direction, and a plurality of joint blocks defining a fluid flow path and supporting each of the plurality of fluid devices, each of the plurality of joint blocks defines a top surface and a bottom surface facing each other, and a side surface extending from the top surface toward the bottom surface side, each of the plurality of fluid devices has a body defining a fluid flow path, and the body has at least two flow path ports open on the bottom surface side thereof, each of the plurality of joint blocks has a screw hole which opens in the top surface and extends toward the bottom surface, each of the plurality of fastening parts is screwed to the screw hole while penetrating the body, and due to the tightening force of the fastening part, a seal member arranged around the flow path port of the joint block and one flow path port of the body, which are abutted against each other, to be pressed between the body and joint block.

10. The work management system according to claim 9, wherein each of the plurality of fastening parts is tightened with a predetermined range of torque.

11. The work management system according to claim 10, wherein the tool is configured such that the grip idles when the predetermined range of torque is exceeded.

12. The work management system according to claim 9, wherein the fluid control device is accommodated in a box, and the work of tightening the plurality of fastening parts is performed through the open ceiling portion of the box.

13. The work management system according to claim 1, further comprising a recording means for associating the coordinate data of the engagement position of the bit calculated by the image processing unit and the tightening torque obtained from the torque-related data and recording in the storage device, wherein the recording means determines whether the coordinate data of the engagement position of the bit which is the same as or approximate to the calculated coordinate data of the engagement position of the bit already exists in the storage device, and if the coordinate data of the engagement position of the bit exists, records them in the storage device while distinguishing them from each other.

14. A work management method that manages a tightening work for tightening each of a plurality of fastening parts included in a product using a tool equipped with a torque sensor capable of detecting a tightening torque for tightening the fastening parts acting on the bit and a first and second markers for image processing, wherein the torque sensor starts measurement of the tightening torque when the detected tightening torque exceeds a set threshold, ends the measurement of the tightening torque when the measurement data satisfies a predetermined condition, and outputs torque-related data including a measurement time based on the measurement data between start of the measurement and end of the measurement;

the method comprising:

capturing images of the product with first and second cameras from different observation points;

receiving the torque-related data output from the torque sensor;

calculating the coordinates of the engagement position of the bit that engages with the fastening part from the plurality of image data of the tool corresponding to the measurement time included in the torque-related data received, and including an image of the first and second markers captured by the first and second cameras during the tightening work of the fastening part; and mounting to the bit a marker mounting device provided with the first and second markers and removably mountable to the bit.

15. The work management method according to claim 14, further comprising recording the calculated coordinate data of the engagement position of the bit and the tightening torque obtained from the torque related data in association with each other in a storage device;

determining whether the coordinate data of an engagement position of the bit which is the same as or similar to the calculated coordinate data of the engagement position of the bit is already present in the storage device when recording, and, if present, recording the two separately in the storage device.

16. A work management apparatus for managing a tightening work for tightening each of a plurality of fastening parts included in a product using a tool provided with a torque sensor capable of detecting a tightening torque for tightening the fastening parts acting on the bit and a first and second markers for image processing, wherein the torque sensor starts measurement of the tightening torque when the detected tightening torque exceeds a set threshold and ends the measurement of the tightening torque when the measurement data satisfies a predetermined condition, and outputs torque-related data including a measurement time based on the measurement data between start of the measurement and end of the measurement, the apparatus comprising a coordinate calculating unit that calculates coordinates of the engagement position of the bit, based on a plurality of image data of the tool corresponding to the measurement time included in the torque-related data received and including the image of the first and second markers captured by first and second cameras during the tightening work of the fastening part, or, based on a two-dimensional coordinates data of the first and second markers extracted from the image data captured by the first camera and a two-dimensional coordinate of the first and second markers extracted from the image data captured by the second camera, wherein the first and second markers are provided on a marker mounting device removably mounted on the bit.

\* \* \* \* \*